United States Patent
Cheng et al.

(10) Patent No.: US 10,157,204 B2
(45) Date of Patent: *Dec. 18, 2018

(54) GENERATING STATISTICAL VIEWS IN A DATABASE SYSTEM

(71) Applicant: International Business Machines Corporation, Armonk, NY (US)

(72) Inventors: Qi Cheng, Toronto (CA); John F. Hornibrook, Markham (CA); Ting Y. Leung, San Jose, CA (US); Xin Wu, San Jose, CA (US); Daniel C. Zilio, Georgetown (CA); Calisto P. Zuzarte, Pickering (CA)

(73) Assignee: International Business Machines Corporation, Armonk, NY (US)

(*) Notice: Subject to any disclaimer, the term of this patent is extended or adjusted under 35 U.S.C. 154(b) by 737 days.

This patent is subject to a terminal disclaimer.

(21) Appl. No.: 13/886,468

(22) Filed: May 3, 2013

(65) Prior Publication Data

US 2014/0012835 A1 Jan. 9, 2014

Related U.S. Application Data

(63) Continuation of application No. 13/361,800, filed on Jan. 30, 2012, now Pat. No. 9,727,608.

(51) Int. Cl.
*G06F 17/00* (2006.01)
*G06F 17/30* (2006.01)

(52) U.S. Cl.
CPC .. *G06F 17/30463* (2013.01); *G06F 17/30289* (2013.01)

(58) Field of Classification Search
USPC .......................................... 707/714
See application file for complete search history.

(56) References Cited

U.S. PATENT DOCUMENTS

| 7,509,311 B2 | 3/2009 | Galindo-Legaria et al. |
| 7,668,804 B1 | 2/2010 | El-Helw et al. |
| 7,725,461 B2 | 5/2010 | Kandil et al. |
| 2008/0228710 A1 | 9/2008 | Muras |
| 2010/0106708 A1 | 4/2010 | Burger et al. |

OTHER PUBLICATIONS

El-Helw, AMR et al., StatAdvisor: Recommending Statistical Views, Proceedings of the VLDB Endowment, Aug. 2009, pp. 1306-1317, vol. 2, Issue 2, ACM, New York, New York, United States.
U.S. Appl. No. 13/361,800, entitled Generating Statistical Views in a Database System, filed Jan. 30, 2012.

*Primary Examiner* — Mariela Reyes
*Assistant Examiner* — Mohsen Almani
(74) *Attorney, Agent, or Firm* — Patterson + Sheridan, LLP

(57) ABSTRACT

Techniques are disclosed for generating statistical views in a database system. In one embodiment, a request is received to execute a database workload. One or more constraints pertaining to executing the database workload is retrieved. The database workload is evaluated to generate multiple statistical view candidates. The statistical view candidates are refined based on the one or more constraints. One or more statistical views are then generated based on the refined statistical view candidates.

20 Claims, 5 Drawing Sheets

GENERATING STATISTICAL VIEWS IN A DATABASE SYSTEM

CROSS-REFERENCE TO RELATED APPLICATIONS

This application is a continuation of co-pending U.S. patent application Ser. No. 13/361,800, filed Jan. 30, 2012. The aforementioned related patent application is herein incorporated by reference in its entirety.

BACKGROUND

Databases are computerized information storage and retrieval systems. A relational database management system is a computer database management system (DBMS) that uses relational techniques for storing and retrieving data. An object-oriented programming database is a database that is congruent with the data defined in object classes and sub-classes.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests are often made using high-level query languages such as Structured Query Language (SQL). Upon receiving such a request, the DBMS may execute the request against a corresponding database, and return any result of the execution to the requesting entity.

SUMMARY

Embodiments of the invention provide a method, computer program product and system for performing an operation that includes receiving a request to execute a database workload. The operation also includes retrieving one or more constraints pertaining to executing the database workload. The operation also includes evaluating the database workload to generate a plurality of statistical view candidates. The operation also includes refining the statistical view candidates based on the retrieved one or more constraints, where refining includes at least one of adding, deleting and updating at least one statistical view candidate. The operation also includes generating one or more statistical views based on the refined statistical view candidates.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
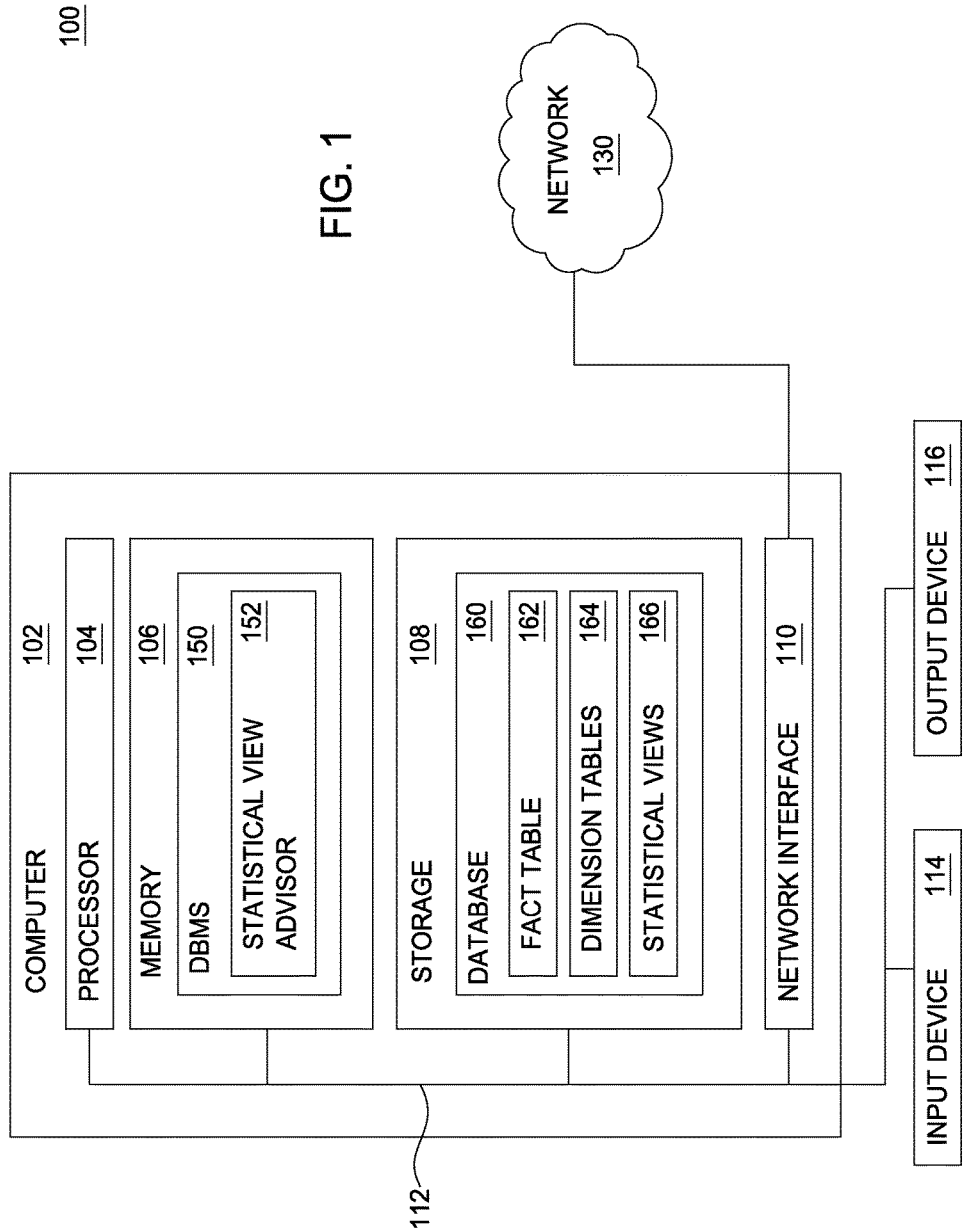
FIG. 1 is a block diagram illustrating a system for generating statistical views in a database system, according to one embodiment of the invention.

Embodiments of the invention provide techniques for generating statistical views in a database system. In one embodiment, a database management system (DBMS) receives a request to execute a specified workload. A predefined component of the DBMS, herein referred to as a statistical view advisor, retrieves one or more constraints pertaining to executing the workload. The statistical view advisor evaluates the workload to generate multiple statistical view candidates. The statistical view advisor then refines the statistical view candidates based on the retrieved constraints. The DBMS generates one or more statistical views based on the refined statistical view candidates. A DBMS configured to manage statistical views according to the techniques disclosed herein may achieve an improved balance between the need for improving query optimizer accuracy with the need for reducing database overhead in maintaining statistical views.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments presented in the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., a DBMS) or related data available in the cloud. For example, the DBMS could execute on a computing system in the cloud and provide access to one or more tables and/or statistical views. The one or more tables and/or statistical views may be stored at a storage location in the cloud. Doing so allows the one or more tables and/or statistical views to be accessed from any computing system attached to a network connected to the cloud (e.g., the Internet).

The flowchart and block diagrams in the Figures illustrate the architecture, functionality, and operation of possible implementations of systems, methods and computer program products according to various embodiments in the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for generating statistical views in a database system, according to one embodiment in the disclosure. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 114 may be any device for providing input to the computer 102. For example, a keyboard and/or a mouse may be used. The output device 116 may be any device for providing output to a user of the computer 102. For example, the output device 116 may be any conventional display screen or set of speakers. Although shown separately from the input device 114, the output device 116 and input device 114 may be combined. For example, a display screen with an integrated touch-screen may be used.

As shown, the memory 106 of the computer 102 includes a database management system (DBMS) 150 configured to manage a database 160 stored in the storage 108 of the computer 102. The database 160 includes a fact table 162 and dimension tables 164. The database is not limited to one fact table and may have multiple fact tables that cross-reference each other. At least in some embodiments, the database 160 serves as a data warehouse or a data mart. Organizations may archive data in a data warehouse, which refers to a collection of data designed to support management decision-making. A given subset of the data warehouse, often specific to a given business unit, may be referred to as a data mart. Data warehouses and data marts may often be characterized by adhering to a star schema or snowflake schema, storing much larger volumes of data than is typically stored in a database, and processing queries much more complex and/or ad-hoc than is typically processed by a database.

Data records in the database 160 may generally be maintained in the form of tables, which are a collection of records all having identical columns. Each column maintains information on a particular type of data in the data records. Each table may be associated with one or more indexes. An index refers to an ordered set of pointers to records in the table based on data in one or more columns of the table. In some cases, all the information needed by a query may be found in the index, making it unnecessary to search the actual table.

Data warehouses and data marts often store a wide variety of data presenting a coherent picture of business conditions at any given point in time. One type of data warehouse schema is a multi-dimensional schema, also referred to as a star schema. In a star schema, information is classified into two groups: facts and dimensions. Facts refer to records pertaining to key transactions of the organization, such as sales data, purchase data, investment returns, etc., and the records are stored in a fact table. Dimensions maintain attributes about data the fact records and are stored in dimension tables. Each dimension table has a primary key column corresponding to a foreign key column in the fact table. Typically, the fact table is much larger than the related dimension tables.

The fact table often includes numerical facts, such as the date of a sale, cost, type of product sold, location, site of sale, etc. The dimension tables may provide attributes containing descriptive textual information pertaining to one of the fact table columns. For instance, a time dimension table can provide attributes on a date column in the fact table that describes the date of sale. The time dimension table may provide various weather conditions or events that occurred on particular dates.

The star schema provides a view of the database on dimension attributes that may be useful for analysis needs of the organization. Using the star schema, users may query on attributes in dimension tables based on search criteria, to locate records in the fact table. A query would qualify rows in the dimension tables that satisfy certain join conditions. The qualifying rows of the dimension tables have primary keys corresponding to foreign keys in the fact table. A join operation, such as an equijoin or a natural join, is then performed on the qualifying rows of the joined dimension tables and the fact table. This join results in returning fact table entries that match the rows of the joined dimension tables, i.e., fact table entries that satisfy the search criteria on the dimension tables. Accordingly, join operations may be used to query a fact table on dimension table attributes. In some embodiments where foreign keys are not explicitly defined, statistical referential integrity constraints are defined between a primary key of a dimension table and joined fact table column(s), upon determining that the join satisfies a prescribed degree of resemblance to a referential constraint.

A join operation may be used to combine or concatenate records from different dimension tables according to a condition or predicate to determine values to apply against the fact table. The join operation is distinguished from a Cartesian product, which concatenates every record from one table with every row from another table, without regard to any condition or predicate to exclude records from the result. In contrast, during a join operation, records not satisfying the predicate or condition are excluded from the result.

The Cartesian product of the records of the dimension tables provides a data view of the entire space, i.e., Cartesian space, of every possible combination of the possible dimension table values. The join result, on the other hand, is a subset of the Cartesian space that is limited to those Cartesian space points that satisfy the join or search condition. One common type of join operation is an equijoin. An equijoin combines two rows from different tables that are equal according to a given attribute. Once the combination of all dimension table records that satisfy the search criteria is generated, the resulting records may then be applied to the fact table in an equijoin operation to locate those records in the fact table that have the same values as the rows resulting from the join on the dimension tables. Typically, the primary key columns of the dimension tables in the join result are compared against the corresponding foreign key columns in the fact table to generate the equijoin results.

In one embodiment, the query language supported by the DBMS 150 is a declarative language, which specifies what data is accessed and not how that data is to be accessed. This stands in contrast to an imperative language, which explicitly specifies how the data is accessed. In one embodiment, to facilitate processing queries composed according to a declarative language, the DBMS 150 includes a query optimizer configured to formulate different plans for accessing data and evaluate the plans to select one for execution. The plans may be evaluated based on costs and/or rules. In one embodiment, to select a least costly plan in terms of resources and/or time, the query optimizer relies on statistics maintained by the DBMS 150, where the statistics include information about the underlying data being accessed. For example, the statistics may include size and/or column-data distribution of tables. Using such statistics, the cost of certain operations, such as simple predicates (e.g., column=value) can be more accurately estimated. The cost of some operations, however, may be much more difficult to estimate. One such example is the cardinality for a join operation, i.e., the number of rows in the result set of the join operation. Additionally, once the cardinality for one operation is inaccurately estimated, the inaccuracy propagates to subsequent operations.

At least in some embodiments, when estimating the cardinality for a join operation, the query optimizer assumes that the join exhibits one or more predefined properties. The predefined properties may include a uniform property and/or an independence property. A join having the uniform property is characterized by having the same number of rows per join column value. A join having multiple join predicates and having the independence property is characterized by the join predicates being independent from each other.

However, joins may often not adhere to the predefined properties. For example, suppose a data warehouse stores ten years of date/time data in a TIME table and several quarters of sales transactions in a SALES table. Suppose the DBMS 150 receives the following query:

TABLE I

Example of a query including a join operation

SELECT t.* FROM TIME t, SALES s, WHERE t.time_key = s.key

If the tables are joined via the query in Table I, then the output of the join will contain only several quarters of sales transactions. If the query optimizer had assumed that the join exhibits the uniform property, the optimizer may have estimated the join cardinality less accurately.

In one embodiment, to aid the query optimizer in evaluating the plans more accurately, database administrators have the option of manually declaring views on statistics collected for various operations handled by the database system (i.e., statistical views). For example, the following database commands may be executed to create a statistical view for the query from the previous example:

TABLE II

Creating a statistical view based on a query having a join operation

CREATE VIEW SV_TIME_FACT AS (SELECT t.* FROM TIME t, SALES s, WHERE t.time_key = s.key);
ALTER VIEW SV_TIME_FACT ENABLE QUERY OPTIMIZATION;
RUNSTATS ON TABLE DBA.SV_TIME_FACT WITH DISTRIBUTION ON COLUMNS (time_key, year_mon);

As shown in Table II, the statistical view may be created by issuing CREATE VIEW, ALTER VIEW, and RUNSTATS commands to the database. The CREATE VIEW command is configured to generate a view having a specified name and based on a specified query. The ALTER VIEW command is configured to designate the statistics associated with a specified view as being available to the query optimizer in evaluating different plans for accessing data. The RUNSTATS command is configured to generate statistics for a specified view. The statistics may include number of records, number of pages, average record length, etc. The WITH DISTRIBUTION option of the RUNSTATS command specifies a predefined sampling technique to be used in generating the statistics.

In one embodiment, after the statistical view is generated, queries corresponding to the statistical view may invoke use of the statistical view by the query optimizer. For example, suppose the DBMS 150 receives the following query:

TABLE III

Example of a query that could invoke use of the statistical view

SELECT SUM(s.price) FROM SALES s, TIME t, PRODUCT p
WHERE t.time_key = s.key AND t.year_mon = '200712'
AND p.prod_key = s.prod_key AND p.prod_desc = 'Power drill'

As shown in Table III, the query includes a join operation corresponding to the statistical view. In response to the query, the DBMS 150 uses the statistics collected from the time_key and year_mon columns for the statistical view. In the absence of the statistical view, the query optimizer may assume that the query exhibits the uniform property. In particular, the query optimizer may assume that every value in the primary key column time_key of the TIME table exists as a value in the KEY column of the SALES table. The query optimizer may also assume that each value in the KEY column of the SALES table has an equal number of rows in the SALES table.

In one embodiment, if the statistical view contains statistics that confirm a uniform property assumed for a join operation, then the query optimizer does not adjust its estimated cardinality of the join based on the statistical view. On the other hand, if the SALES table contains many more rows corresponding to a handful of time_key values than other time_key values, then there is data skew that could affect the distribution and hence the accuracy of the estimation by the query optimizer. Further, the presence of a local predicate on the year_mon column in the query, such that only the handful of time_key values is requested, could also be another source of data skew. For example, this type of the data skew could be present if there is a dependency between the year_mon and time_key columns. In one embodiment, the statistical view includes a count of rows for the join and the dependency between the year_mon and time_key columns. Using the statistical view, the query optimizer may more accurately estimate costs associated with each plan for the query.

In one embodiment, because the number of statistical views that can be declared for a database system could be unlimited, it may be cost-prohibitive to manually declare and maintain all of the statistical views. In particular, each additionally declared statistical view incurs storage costs and processing costs in keeping the statistical view up-to-date. Further, it would be impractical for the query optimizer to search through such a large number of statistical views when processing a query.

In one embodiment, the DBMS 150 is configured to manage statistical views based on techniques disclosed herein, to better balance the need for improving query optimizer accuracy with the need for reducing database overhead in maintaining statistical views. For example, the DBMS 150 may include a statistical view advisor 152 configured to determine what statistical views should be created, modified, and/or deleted, based on a given database workload. As used herein, a database workload (or workload) refers to a set of database commands, such as SQL statements, logically grouped together to achieve a desired result. Each workload includes multiple sub-expressions which can be a whole or part of a database command. Further, the DBMS 150 may be configured to collect data relating to optimizing and executing a workload. Data relating to optimizing and executing a workload may include, for example, the cardinality of a sub-expression (e.g., a join operation) estimated by the query optimizer and the actual cardinality of the result set obtained for executing the sub-expression.

In one embodiment, the DBMS 150 may generate a set of one or more statistical views based on the optimization and execution data. Each statistical view corresponds to a sub-expression in the workload and contains statistics pertaining to the results of the sub-expression. For example, the statistics may include cardinality, count of unique values, most frequent value, etc. In contrast, a materialized view of the sub-expression includes the actual results of the sub-expression. In some embodiments, the count of statistical views may be may be less than the count of sub-expressions in the workload. For example, statistical views may be generated only for those sub-expressions for which the query optimizer computed an incorrect cardinality estimate. Statistical views may also be generated for those sub-expressions that the query optimizer often encounters and/or that require substantial processing on the part of the query optimizer.

In one embodiment, the statistical view advisor 152 determines to create, modify, or delete statistical views based on factors such as statistical collection time, count of statistical views, count of tables per statistical view, and/or count of columns per statistical view. The statistical view advisor 152 may also recommend creating one or more referential integrity constraints between tables. The statistical view advisor may also recommend including sub-expressions and column groups in the statistical views output by the statistical view advisor. The statistical view advisor 152 may also verify that the database optimizer adopts recommendations of the statistical view advisor 152. Accordingly, the objective to reduce costs associated with generating and maintaining statistical views may be balanced against the objective to improve the accuracy of the query optimizer.

Figure 2:
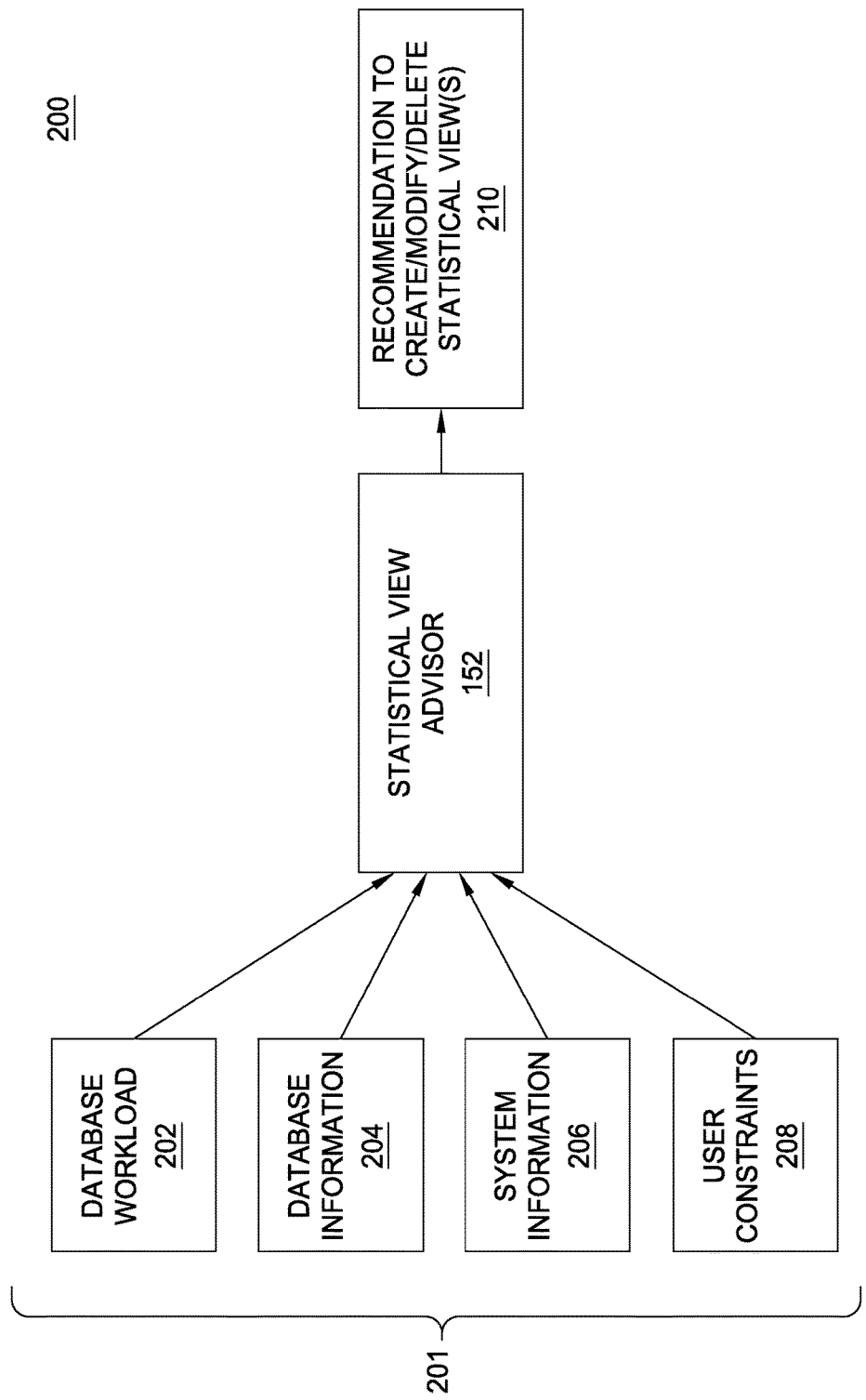
FIG. 2 illustrates a data flow diagram of a statistical view advisor component of a database management system (DBMS), according to one embodiment of the invention.

FIG. 2 illustrates a data flow diagram of the statistical view advisor 152 of FIG. 1, according to one embodiment in the disclosure. As shown, the statistical view advisor 152 generates a recommendation 152 to create, modify, or delete a statistical view based on inputs 201. The inputs 201 include a database workload 202, database information 204, system information 206, and user constraints 208. As described above, the database workload 202 is a set of one or more database commands that are logically grouped together to achieve a desired result. In some embodiments, the workload 202 may also specify a frequency in which to execute a given database command over a specified period of time. The database information 204 includes metadata pertaining to the database, such as table names, schemas, column types, database statistics, constraints, etc. The system information 206 includes metadata pertaining to the computer system, such as CPU speed, I/O rates, count of partitions in a multi-partitioned processing system, etc.

In one embodiment, the user constraints 208 include any of a number of predefined constraints supported by the statistical view advisor 152. For example, the user constraints 208 may impose a limit on the time that the statistical view advisor is allowed to spend in collecting statistics for new and/or existing statistical views. The user constraints 208 may also impose a limit on the number of statistical views that the statistical view advisor 152 is allowed to recommend. Further, the user constraints 208 may impose a limit on the number of statistical views that the DBMS 150 is allowed to maintain, either per table or globally. The user constraints 208 may also impose a limit on the time that the statistical view advisor is allowed to spend in processing a given workload. Further still, the user constraints 208 may impose a limit on the number of columns allowed per statistical view. The user constraints 208 may also include a flag indicating whether to output recommendations regarding referential integrity constraints. Other constraints not departing from the scope of the present disclosure are broadly contemplated. For example, in some embodiments, one or more constraints may be defined and/or supplied by an application rather than by a user.

Figure 3:
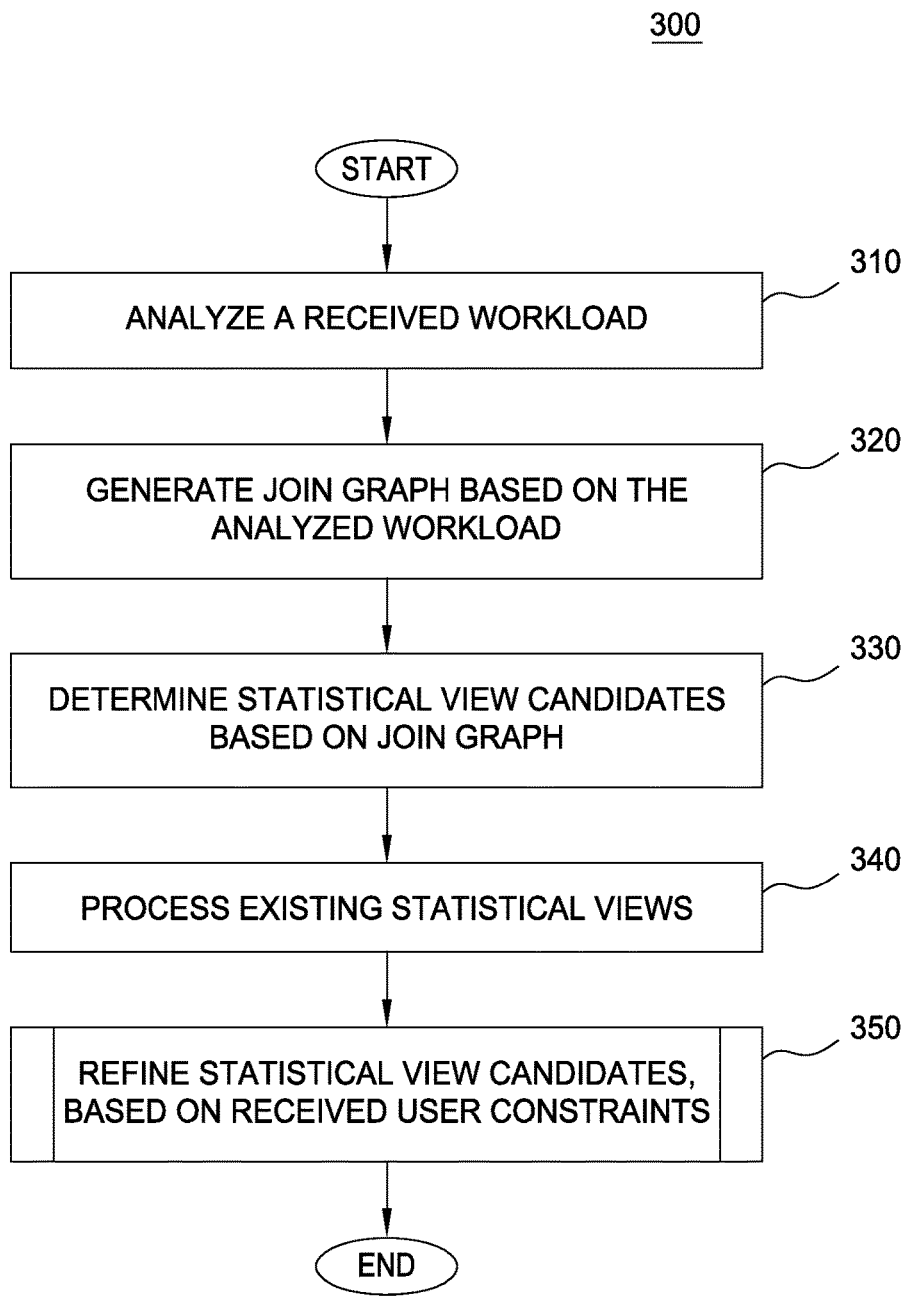
FIG. 3 is a flowchart depicting a method for generating a recommendation pertaining to statistical views, according to one embodiment of the invention.

FIG. 3 is a flowchart depicting a method 300 for generating a recommendation pertaining to statistical views, according to one embodiment in the disclosure. The recommendation may specify to generate, modify, or delete one or more statistical views. The method 300 begins at step 310, where the statistical view advisor 152 analyzes a received workload. To this end, the statistical view advisor 152 may perform an explain operation on the workload. The explain operation outputs information regarding an access plan and environment associated with the workload. The statistical view advisor 152 may also evaluate the constructs in the workload, including determining the join predicates in the workload, determining the grouping and ordering operations in the workload, and identifying the tables and columns used in predicates, grouping, and ordering. Further, the statistical view advisor 152 may evaluate local predicate columns in the tables, evaluate expressions in the workload referencing table columns used in the predicates, grouping, or ordering, and analyze information from the query optimizer that identifies which existing statistical views are actually used by the query optimizer in evaluating and selecting plans. The information may subsequently be used to determine which existing statistical views can be merged with newly generated statistical views and/or output a list of unused statistical views.

In one embodiment, a statement list is associated with each construct such as a join or a local predicate column. The statement list is configured to assign, based on user input, a weighting of each construct to determine the benefit of each construct to the workload. The benefit is subsequently used in conjunction with costs included in the statistical view. For example, in pruning a construct from a statistical view, the statistical view advisor 152 may identify the construct of least benefit (or statement coverage) and greatest cost (e.g., greatest time contribution to a RUNSTATS command). Using the statement list, the statistical view advisor 152 can tie together expressions and joins having local predicate columns. When adding a join of high skew to a statistical view, the statistical view advisor 152 includes the local predicate columns and expressions from the statements in which the join appears. The local predicate columns and expressions in the SELECT clause of the query—in addition to which joins are in the statistical views—are included when evaluating the costs based on the collected statistics.

At step 320, the statistical view advisor 152 generates a join graph based on the received workload. The join graph is subsequently used in identifying which joins are used in conjunction with one another, to form one or more statistical views. The join graph may also be used in identifying which tables are fact tables and dimension tables in schemas such as star schemas. The join graph may also be used to determine if any implied joins should be created via transitive closure—e.g., if a query includes joins t.a=s.a and s.a=r.a, then through transitive closure, then a join t.a=r.a is implied. The implied joins are added to the join information such as to increase the number of statistical view candidates that are created.

In one embodiment, once the join graph is generated and the implied joins are added, the statistical view advisor 152 computes the join arity—i.e., the number of relations to be joined—by determining whether unique keys exist on join columns on one of the joined tables. A unique key on one side of the join denotes that one value on the side may derive one or more values on the other side of the join. In some embodiments, where single columns can be merged together such that join columns on one of the joined tables form a unique key, the statistical view advisor 152 creates a multi-column join.

In one embodiment, joins are classified as having arity 1:1, 1:N, or N:M, where N and M each represent an integer greater than one. Arity 1:1 specifies that there is a one-to-one relationship between corresponding values contained in the joined tables for each unique value contained in one of the joined tables. Arity 1:N specifies that there is a one-to-many relationship between the corresponding values contained in the joined tables. Arity N:M specifies that there is a many-to-many relationship between the corresponding values contained in the joined tables. In one embodiment, because joins of arity 1:1 would not improve the accuracy of the query optimizer in estimating costs of plans, such joins are ignored when generating statistical views.

In one embodiment, because statistical views are generated to allow the query optimizer to estimate skew in data after joins are applied, only joins satisfying a threshold are considered in generating the statistical views. The skew and threshold may be determined in multiple ways, such as determining a ratio between the number of rows for the most frequent value on the foreign key compared to the average number of rows per value of the foreign key. If the ratios exceed a predefined threshold, then the join is determined to be skewed. In another embodiment, the skew is determined by using a measure of statistical dispersion. One example of a measure of statistical dispersion is a Gini coefficient. In some embodiments, the Gini coefficient is used when the join columns contain frequently occurring values. The Gini coefficient may be used to detect skew based on comparing how far the frequency distribution of the join columns is from a uniform distribution curve. To this end, the frequency distribution information is ordered from least-frequently-occurring value to most-frequently-occurring value and is converted to a cumulative frequency distribution, such as may be the case when the frequency values are read in order from the database catalog tables. In some embodiments, a RUNSTATS command having a WITH DISTRIBUTION option is used to collect frequency value distributions for the desired join columns. If the join columns do not contain any frequently occurring values, then the join columns may be assumed to have a uniform distribution.

Figure 4:
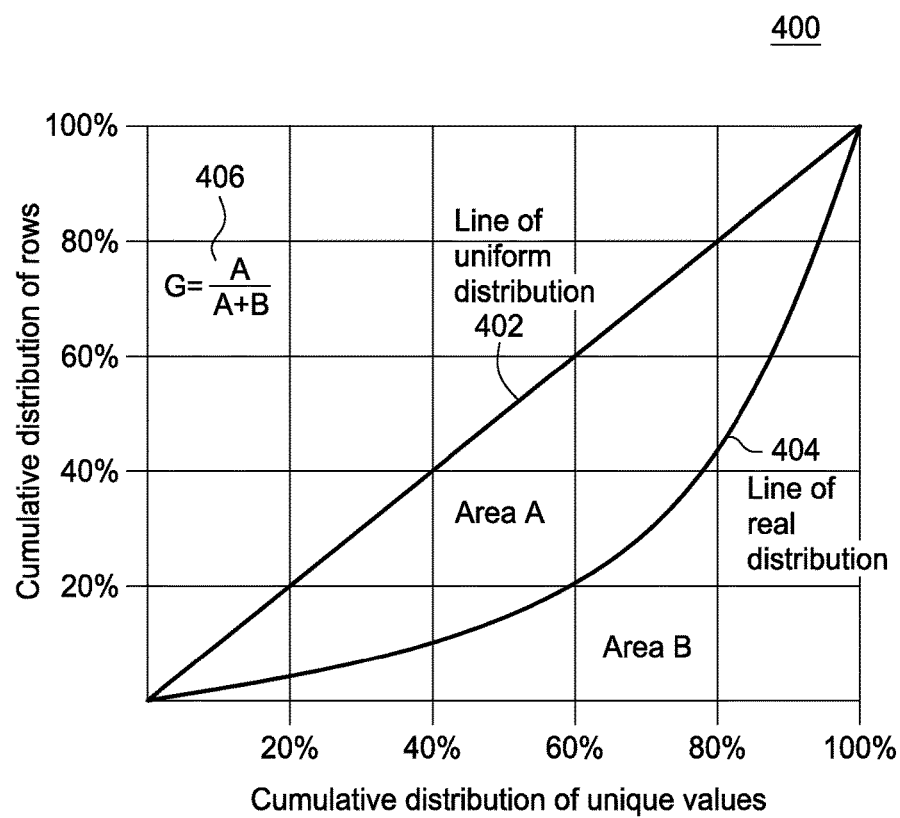
FIG. 4 depicts a graph for determining a measure of statistical dispersion for a join column, according to one embodiment of the invention.

FIG. 4 depicts a graph 400 for determining a measure of statistical dispersion for a join column, according to one embodiment in the disclosure. In this particular example, the measure of statistical dispersion is a Gini coefficient. The graph 400 includes a line of uniform distribution 402 and a line of real distribution 404. The line of real distribution 404 is obtained by plotting the cumulative frequency distribution of unique join key values in the join column against the cumulative frequency distribution of rows in the target table of the join. The line of uniform distribution 402 is obtained by plotting a straight line representing an assumption that each unique join key value has the same contribution to the total summation of records matching all join key values. The Gini coefficient, denoted by G 406, is then given by an equation A/(A+B), where A represents the area between the line of uniform distribution 402 and the line of real distribution 404, and where B represents the area between the line of uniform distribution 404 and the x-axis. The Gini coefficient is between the values of zero and one, where one represents the highest skew and where zero represents no skew.

To further illustrate how the Gini coefficient is determined, suppose that the DBMS 150 receives a query specifying to join a fact table F and a dimension table D1, where the join column in D1 contains 3,000 key values and where F contains 10,000 rows corresponding to the 3,000 key values. In this particular example, a uniform distribution is represented by approximately 3.33 rows in F per join key value. The slope of the cumulative frequency distribution would be 3.33 where the x-axis represents the join key values and where the y-axis represents the number of corresponding rows in F. The area A+B is the area beneath the line of uniform distribution 402, which may be given by 0.5*graph height*graph width=0.5*number of rows*number of join key values=0.5*10,000*3,000=15 million. Suppose that in the real frequency distribution, a total of 7,000 rows in F correspond to the key value of "1" in the join column in D1, while only a single row in F corresponds to each of the remaining 2,999 key values in the join column in D1. Then the area B is given by a triangle of height 2,999 (number of corresponding rows) and width 2,999 (number of key values) plus a thin rectangle of width one and height 10,000. That is, area B=0.5*2,999^2+10,000*1~4.5 million. The Gini coefficient G may then be computed as G=A/(A+B)=[(A+B)−B]/(A+B)~(15 million-4.5 million)/15 million=0.7. The join between F and D1 may then be considered to exhibit high skew to the extent that 0.7 is considered to be close to the value of one. The higher the skew value, the more likely is the statistical view advisor 152 to recommend creating a statistical view for a query having the join operation. In some embodiments, a threshold for high skew is determined based on a predefined percentile of highest skews from the processing of historical workloads. In such embodiments, the statistical view advisor 152 is more likely to recommend creating a statistical view for a query having a join operation exceeding the skew threshold.

Referring once again to FIG. 3, at step 330, the statistical view advisor 152 determines statistical view candidates based on the join graph created in the previous step. In some embodiments, the statistical view advisor 152 may also recommend creating a referential integrity constraint for the join columns in the query. The referential integrity constraint may be a statistical referential integrity constraint or an informational referential integrity constraint. For example, a referential integrity constraint may be recommended if the foreign keys from a joined table for the most part correspond to the primary keys of the other joined table for joins having arity of 1:N. For instance, a referential integrity constraint may be recommended if the number of rows having foreign key values not in the primary key value set (including rows having a null value) is below a predetermined threshold of ten percent of the number of rows in the foreign key table. In some embodiments, the recommendations pertaining to statistical views and integrity constraints may be respectively weighted based on predetermined factors such as how often the underlying tables are updated and for what duration the underlying tables stored data nearly satisfying the criteria for recommendation a referential integrity constraint. Filtering may also be performed on candidate constraints for underlying tables that are regularly updated.

In some embodiments, the DBMS 150 creates a statistical view corresponding to a fully connected join graph associated with a workload. In such cases, the statistical view may also be matched with queries having join operations matching a subset of the joins in the join graph, provided that each join operation has an associated referential integrity constraint. When no referential integrity constraint is present, the join operation is matched with a statistical view containing a single join (including a join having arity of N:M).

In one embodiment, the statistical view advisor 152 adds a statistical view candidate for each connected join subgraph from the join graph of 1:N joins having referential integrity constraints. In some embodiments where cycles in the joins of a statistical view are not allowed, the same restriction is applied to each connected join subgraph. Further, in some embodiments, statistical view candidates are formed for at least a predefined count of connected acyclic subgraphs having the highest skew. When adding a statistical view candidate for a given join, the associated tables and join columns are associated with the statistical view candidate. Further, statements corresponding to the given join are included in the set of statements corresponding to the statistical view candidate. Any local predicates or grouping/ordering columns or expressions are also added to the statistical view candidate. In some embodiments, only statistical view candidates having local predicates and/or grouping/ordering columns or expressions are retained as candidates.

In some embodiments, statistical views with expressions used in predicates from the workload could also be generated with the expressions as the first elements added to the statistical views. Further, tables having columns used in the expression can also be added to the statistical views. Further still, joins on the tables from the same statements as the expression could also be added to the statistical views. These statistical views could pertain to a single table if the expressions also pertain to only a single table. Further, joins added to these statistical views need not be skewed, because the joins serve to provide desired expression statistics via the statistical views. In one embodiment, if the columns in an expression all refer to a single dimension table, an extra statistical view may be generated with the expression in the SELECT clause and one the dimension table in the FROM clause. Accordingly, predicates containing the expression may have associated statistics modified by the recommended statistical view, even if the query does not contain a join.

In one embodiment, each statistical view candidate is weighted based on statistics collected for the respective statistical view candidate, e.g., via a RUNSTATS command. Additionally or alternatively, each statistical view candidate is weighted based on costs of statements corresponding to the statistical view candidate. At least in some embodiments, the statistical view advisor 152 is more likely to prune statistical view candidates having high estimated execution time and low statement cost coverage. In some embodiments, the statistical view advisor 152 defines the statistics to be collected for each statistical view candidate. The definition specifies whether cardinalities and/or distribution statistics (such as the number of frequently occurring values or quantile of a histogram) should be collected for a specified column. The definition may also specify column groups and what statistics should be collected for the column groups. The column groups may be determined based on which columns are used in the same statements and how the columns are used together, e.g., whether the columns are all used in local equality predicates in the same statements. Columns and associated expression statistics for a statistical view can be determined by how the table columns and expressions are used in the statistical view, e.g., whether the table columns are used in range predicates for distribution collection.

At step 340, the statistical view advisor 152 processes statistical views that already exist in the database system. In one embodiment, the query optimizer is configured to provide, based on analyzing a workload, information on which existing statistical views are used for each given statement in the workload. The statistical view advisor generates a list of existing statistical views that are not used by any of the statements in the workload. The statistical view advisor may also parse existing statistical views that are used, to identify constructs for statistics collection. For example, the RUNSTATS command may be invoked on the constructs to determine an estimated execution time associated with the statistical view and/or to determine which tables, joins, columns, column groups, and expressions are included in the statistical view.

In one embodiment, the statistical view advisor 152 compares constructs of statistical view candidates to those of existing, used statistical views to determine candidates for merging. For example, if the join graph of an existing statistical view is subsumed by a new statistical view candidate, then the statistical view advisor 152 may merge constructs such as the columns, expressions, column groups, and statistics to be collected, into a single, merged statistical view that replaces the existing statistical view. In effect, the existing statistical view may considered to be modified to become the merged statistical view. In some embodiments, however, the statistical view advisor 152 may also remove, from the merged statistical view, one or more constructs just newly added to the merged statistical view and/or previously in the existing statistical view. The merged statistical view may then be designated as a statistical view candidate.

At step 350, the statistical view advisor 152 refines the statistical view candidates based on received user constraints. To this end, one or more predefined pruning techniques may be applied to the statistical view candidates. For example, one pruning technique involves merging statistical views that can be subsumed to form new statistical view candidates. The merging may be performed to satisfy user constraints limiting the total count of statistical views allowed. Another pruning technique involves splitting a statistical view into two or more smaller statistical views. For example, a complex statistical view having multiple joins and for which statistics collection is prohibitively expensive computationally may be split into multiple statistical views, to reduce the time required to collect statistics for each individual statistical view. To this end, a subset of the joins and associated tables are placed in each new statistical view such that the number of tables in each new statistical view is reduced relative to the original statistical view. The splitting may be performed to satisfy user constraints limiting the estimated execution time of a statistical view and insofar as other user constraints that limit the total count of statistical views are not violated.

Yet another pruning technique involves increasing the sampling rate on the statistical views, to reduce the computational costs of collecting statistics for the statistical views. Still another pruning technique involves removing constructs from a statistical view to reduce the computational costs of statistic collection. To this end, each construct may be weighted using techniques described above, to select a construct of least weight. Removing the constructs may facilitate satisfying a user constraint limiting the number of statistical views for a specified table or limiting the number of columns per statistical view. The pruning techniques described above may be performed iteratively until all user constraints are satisfied.

In some embodiments, after the step 350, the statistical view advisor 152 optionally performs one or more additional operations, insofar as any user constraints limiting the execution time of the statistical view advisor 152 are not violated. For example, the statistical view advisor 152 may create a virtual statistical view such that matching information can be determined when recompiling or explaining workload statements. In one embodiment, all statistical view candidates remaining after the pruning phase can be created as virtual statistical views, and the workload can be compiled. Once the workload is compiled, the statistical view advisor 152 may remove, from a virtual statistical view, any expressions that do not have a match. The statistical view advisor 152 may also remove virtual statistical views having no matching expressions. Subsequently, the statistical view advisor 152 may re-add previously-pruned statistical view candidates insofar as no user constraints are violated. In some embodiments, the statistical view advisor 152 may re-refine the candidates to ensure that the user constraints remain satisfied.

In one embodiment, once the set of statistical view candidates is finalized, the statistical view advisor 152 may output a recommendation regarding the statistical view candidates. In some embodiments, the statistical view advisor 152 additionally or alternatively outputs database commands for effecting the recommendation of the statistical view advisor 152. For example, the database commands may include the CREATE VIEW, ALTER VIEW, and RUNSTATS commands shown in Table II. Depending on the embodiment, the database commands may be executed by the DBMS 150 or by the statistical view advisor 152, with or without user input.

Figure 5:
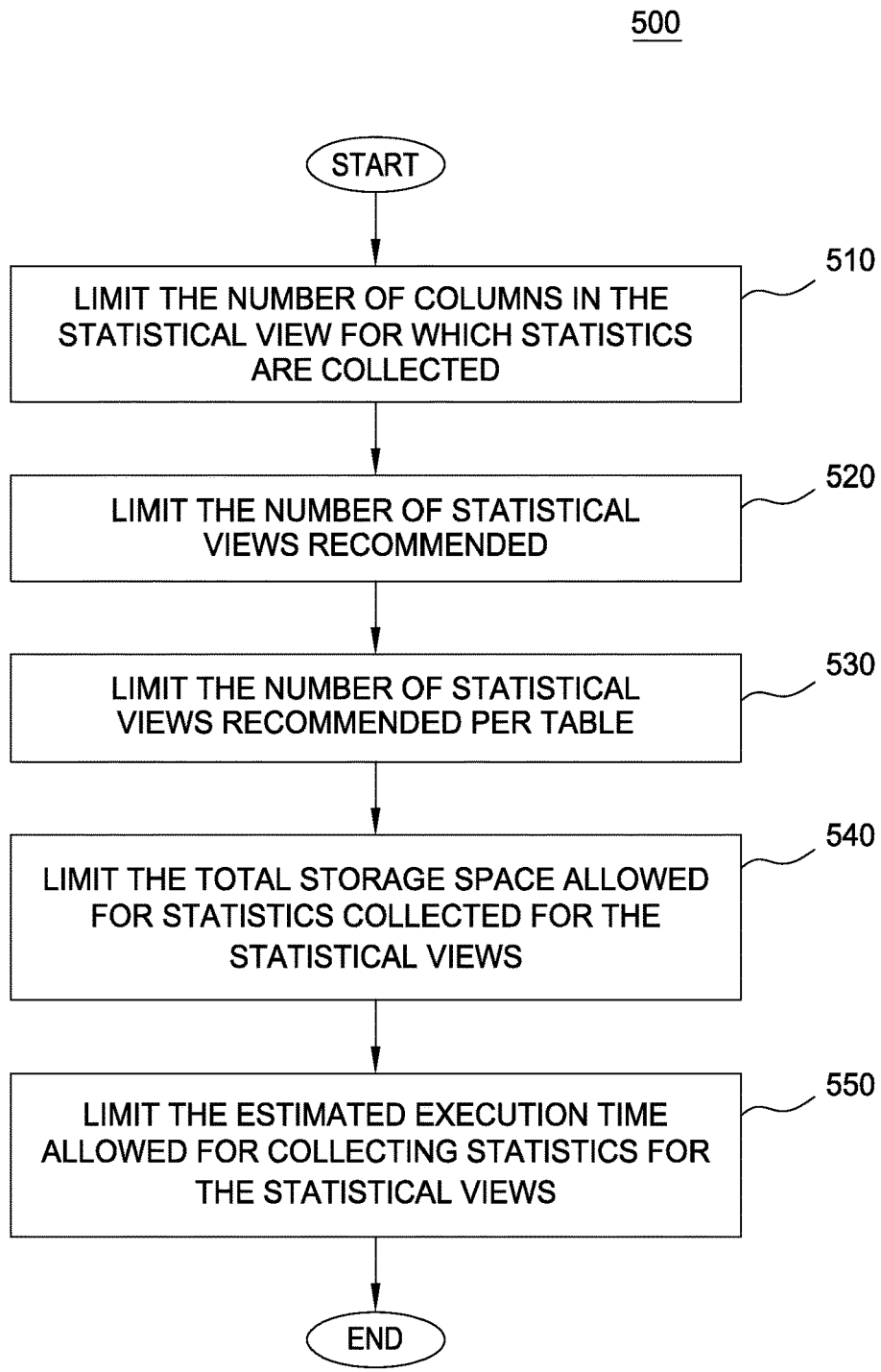
FIG. 5 is a flowchart depicting a method for refining statistical view candidates, according to one embodiment of the invention.

FIG. 5 is a flowchart depicting a method 500 for refining statistical view candidates, according to one embodiment in the disclosure. The method 500 corresponds to the step 350 of FIG. 3. As shown, the method 500 begins at step 510, where the statistical view advisor 152 limits the number of columns in the statistical view for which statistics are collected by the DBMS 150. At step 520, the statistical view advisor 152 additionally or alternatively limits the number of total statistical views recommended by the statistical view advisor 152. At step 530, the statistical view advisor 152 limits the number of statistical views recommended for one or more specified tables. At step 540, the statistical view advisor 152 limits the total storage space allowed for statistics collected for the statistical views. At step 550, the statistical view advisor 152 limits the estimated execution time allowed for collecting statistics for the statistical views. After the step 550, the method 500 terminates. In one embodiment, when the step 550 is complete and new statistical views have been generated, the method 500 may iterate back to the step 510 to determine if the newly generated statistical views may be modified. In this embodiment, the method 500 may cease to iterate when no more new statistical views are generated, when a time limit is exceeded, or when a predefined count of iterations have been completed.

In one embodiment, the statistical view advisor 152 may also check for and eliminate duplicate statistical views. A statistical view is a duplicate of another statistical view when the sub-expressions corresponding to the two statistical views are identical or when one of the sub-expressions is a prefix of the other sub-expression. The check for duplicates may be performed each time after a predefined count of statistical views is generated. In determining whether a statistical view is a duplicate, the statistical view advisor 152 may consider existing statistical views that are being maintained by the DBMS 150. In one embodiment, the statistical view advisor 152 may delete the existing statistical view rather than the newly created statistical view, because the statistics in the existing statistical view may be stale.

In one embodiment, the statistical view advisor 152 may also reduce the number of statistical views by generalizing similar statistical views into a single statistical view. A generalized statistical view is one that represents several sub-expressions $expr_1$, $expr_2$, . . . , $expr_n$, where n is a positive integer, and derives from a generalized sub-expression $expr_G$ that can be reduced to any sub-expression $expr_i$, where i=1 to n, by the application of a predefined operation. For example, suppose a statistical view is generated for each of the following sub-expressions of a workload:

TABLE IV

Example sub-expressions to be generalized

SELECT column_2 FROM table_1 WHERE condition_1 AND column_1=4 GROUP BY column_3
SELECT column_2 FROM table_1 WHERE condition_1 AND column_1=6 GROUP BY column_3

Because the workload contains sub-expressions differing only by a constant, the statistical view advisor may generalize the statistical views into a single statistical view that is independent of the constants. For example, the single statistical view may be represented by the following query:

TABLE V

Example of a query representing a generalized statistical view

SELECT column_2, column_1 from table_1 WHERE condition_1 GROUP BY column_3, column_1

After generating the single statistical view, the statistical view advisor 152 may delete the statistical views corresponding to the sub-expressions to be generalized. The decision to generalize statistical views may be balanced with loss of exact statistics for the constants, to suit the needs of a particular case. A lookup of histograms associated with the underlying tables may be informative in determining whether to maintain or generalize the existing statistical views.

In some embodiments, statistical views bearing fewer similarities may also be generalized. For example, suppose a statistical view is generated for each of the following sub-expressions of a workload:

TABLE VI

Example sub-expressions to be generalized

SELECT column_2 FROM table_1 WHERE condition_1 AND column_1=4 GROUP BY column_3
SELECT column_4 FROM table_1 WHERE condition_2 AND column_1=6 GROUP BY column_3

Although the workload includes queries specifying different columns in the SELECT clause and specifying different conditions, the statistical view advisor may still generalize the statistical views into a single statistical view. For example, the single statistical view may be represented by the following query:

TABLE VII

Example of a query representing a generalized statistical view

SELECT column_4, column_2, column_1 FROM table_1 WHERE condition_1 OR condition_2 GROUP BY column_3, column_1

As with eliminating duplicate statistical views, generalizing and merging statistical views may be performed in batches or after a set of one or more statistical views are generated. Depending on the embodiment, the statistical views that are generalized and/or merged may be newly-generated, pre-existing, or both. Accordingly, the count of statistical views generated may be less than the count of sub-expressions contained in a workload. Further, in some embodiments, statistical views are generated only for sub-expressions for which the query optimizer generated an inaccurate estimate, e.g., an inaccurate cardinality estimate. The inaccurate estimate may be detected, for example, by comparing estimated optimization statistics to actual execution statistics.

Embodiments presented in the disclosure provide techniques for generating statistical views in a database system. In one embodiment, a DBMS receives a request to execute a specified workload. A statistical view advisor component of the DBMS retrieves one or more constraints pertaining to executing the workload. The statistical view advisor evaluates the workload to generate multiple statistical view candidates. The statistical view advisor then refines the statistical view candidates based on the retrieved constraints. The database system generates one or more statistical views based on the refined statistical view candidates. A DBMS configured to manage statistical views according to the techniques disclosed herein may achieve an improved balance between the need for improving query optimizer accuracy with the need for reducing database overhead in maintaining statistical views.

While the foregoing is directed to embodiments of the present invention, other and further embodiments of the invention may be devised without departing from the basic scope thereof, and the scope thereof is determined by the claims that follow.

What is claimed is:

1. A computer-implemented method of statistical view refinement based on constraints in order to reduce a processing cost incurred in maintaining statistical views in a database management system, the computer-implemented method comprising:

responsive to receiving a request to execute a database workload including a plurality of sub-expressions, evaluating the database workload in order to generate a join graph;

determining a respective arity for each of a plurality of joins in the database workload, including a one-to-one arity for a first join, a one-to-many arity of a second join, and a many-to-many arity for a third join, wherein any join having one-to-one arity is disregarded in statistical view generation;

determining a respective skew for each of the plurality of joins in the database workload, at least one skew of which is determined based on at least one of: (i) a measure of an extent to which a value frequency distribution of a column the respective join deviates from a uniform value-frequency distribution of the column of the respective join; and (ii) a ratio between: (A) a count of rows of a respective value having a highest frequency in a respective foreign key and (B) an average count of rows per value of the respective foreign key;

generating a plurality of statistical view candidates, based on the respective arity of each of the plurality of joins, the respective skew for each of the plurality of joins, and the join graph;

identifying one or more predefined constraints pertaining to executing the database workload;

programmatically refining the statistical view candidates by operation of one or more computer processors and based on the identified one or more predefined constraints in order to generate a set of refined statistical view candidates that excludes at least one of the plurality of statistical view candidates, wherein statistical view generation from the plurality of statistical view candidates is restricted to the set of refined statistical view candidates;

generating one or more statistical views based on the refined statistical view candidates, wherein no statistical view is generated based on the excluded at least one statistical view candidate, wherein the processing cost incurred in maintaining statistical views in the database management system is reduced by at least a measure associated with the excluded at least one statistical view candidate;

generating a plurality of distinct plans for executing the database workload, including determining an estimated cost for each of the plurality of distinct plans based on the one or more statistical views and with a higher degree of accuracy than in an absence of the one or more statistical views, wherein the first plan is selected for executing the database workload, based on the estimated cost; and executing the database workload according to the selected plan in order to generate a set of results, wherein the set of results is output.

2. The computer-implemented method of claim 1, wherein at least one generated statistical view includes a column sub-expression or specifies to generate statistics pertaining to a column group having a plurality of columns, and wherein the one or more predefined constraints includes at least one of:

(i) a first constraint refining a first specified statistical view candidate by imposing a limit on a total count of columns in the first specified statistical view candidate;

(ii) a second constraint refining the plurality of statistical view candidates by imposing a limit on a total count of statistical views generated from the plurality of statistical view candidates;

(iii) a third constraint refining the plurality of statistical view candidates by imposing a limit on a total count of statistical views generated from the plurality of statistical view candidates, for a specified database table;

(iv) a fourth constraint refining a second specified statistical view candidate by imposing a limit on a total amount of storage used to store statistics collected for the second specified statistical view candidate; and (v) a fifth constraint refining a third specified statistical view candidate by imposing a limit on an estimated execution time for collecting statistics for the third specified statistical view.

3. The computer-implemented method of claim 1, wherein at least one pre-existing statistical view is merged, updated, or deleted, based on retrieved information indicating that the pre-existing statistical view has no effect on decision-making of a query optimizer component of the database management system.

4. The computer-implemented method of claim 1, wherein refining the statistical view candidates comprises removing at least one statistical view candidate, and wherein the removed statistical view candidate is subsequently re-added without violating any of the one or more predefined constraints.

5. The computer-implemented method of claim 1, wherein the plurality of statistical view candidates is generated based on one or more joins in the workload, each join of which has a skew exceeding a predefined threshold skew.

6. The computer-implemented method of claim 1, wherein identifying one or more predefined constraints pertaining to executing the database workload comprises identifying a plurality of distinct constraints including at least two of a first constraint, a second constraint, a third constraint, a fourth constraint, and a fifth constraint, wherein programmatically refining the statistical view candidates based on the identified one or more predefined constraints comprises programmatically refining the statistical view candidates based on the plurality of distinct constraints, wherein at least one generated statistical view includes a column sub-expression or specifies to generate statistics pertaining to a column group having a plurality of columns.

7. The computer-implemented method of claim 6, wherein the first constraint refines a first specified statistical view candidate by imposing a limit on a total count of columns in the first specified statistical view candidate, wherein the second constraint refines the plurality of statistical view candidates by imposing a limit on a total count of statistical views generated from the plurality of statistical view candidates, wherein the computer-implemented method further includes identifying, for the database workload, a set of criteria one or more one or more fact tables, one or more dimension tables, one or more express joins, and one or more implied joins, the set of criteria further including the respective arity for each of the plurality of joins and the respective skew for each of the plurality of joins, wherein the plurality of statistical view candidates is generated based on the identified set of criteria, wherein the third constraint refines the plurality of statistical view candidates by imposing a limit on a total count of statistical views generated from the plurality of statistical view candidates, for a specified database table.

8. The computer-implemented method of claim 7, wherein the fourth constraint refines a second specified statistical view candidate by imposing a limit on a total amount of storage used to store statistics collected for the second specified statistical view candidate, wherein the fifth constraint refines a third specified statistical view candidate by imposing a limit on an estimated execution time for collecting statistics for the third specified statistical view candidate;

wherein refining the plurality of statistical view candidates comprises at least one of adding, deleting and updating at least one statistical view candidate, wherein at least one pre-existing statistical view is, in respective instances, merged, updated, and deleted, based on retrieved information indicating that the pre-existing statistical view has no effect on decision-making of a query optimizer component of the database management system.

9. The computer-implemented method of claim 8, wherein the plurality of distinct constraints include at least three of the first, second, third, fourth, and fifth constraints, wherein refining the statistical view candidates comprises removing at least one statistical view candidate, and wherein the removed statistical view candidate is subsequently re-added without violating any of the one or more predefined constraints, wherein the plurality of statistical view candidates is generated based on one or more joins in the database workload that each has a skew exceeding a predefined threshold skew.

10. The computer-implemented method of claim 9, wherein the plurality of distinct constraints include at least four of the first, second, third, fourth, and fifth constraints, wherein the skew for at least one of the one or more joins in the database workload is determined based on a predefined measure of statistical dispersion, wherein the total count of statistical views generated is less than the total count of sub-expressions in the workload;

wherein the set of refined statistical view candidates excludes at least two of the plurality of statistical view candidates, each statistical view candidate of which is excluded based on a respective, distinct one of the first, second, third, fourth, and fifth constraints, wherein no statistical view is generated based on the excluded at least two statistical view candidates, wherein the processing cost incurred in maintaining statistical views in the database management system is reduced by at least a measure associated with the excluded at least two statistical view candidates, wherein generating one or more statistical views based on the refined statistical view candidates comprises, in respective instances, each of:

eliminating a statistical view that is determined to be a duplicate of at least one other statistical view, wherein each statistical view is selected from a statistical view candidate and a pre-existing statistical view; and merging at least two statistical views into a single statistical view.

11. The computer-implemented method of claim 10, wherein the plurality of distinct constraints include all of the first, second, third, fourth, and fifth constraints, whereby a processing cost incurred in statistical view maintenance by the query optimizer component of the database management system is reduced, relative to statistical view generation of the plurality of statistical view candidates not being restricted to the set of refined statistical view candidates, wherein the at least one generated statistical view, in respective instances, includes the column sub-expression and specifies to generate the statistics pertaining to the column group having the plurality of columns, wherein refining comprises, in respective instances, each of adding, deleting and updating at least one statistical view candidate;

wherein the set of refined statistical view candidates excludes at least three of the plurality of statistical view candidates, each statistical view candidate of which is excluded based on a respective, distinct one of the first, second, third, fourth, and fifth constraints, wherein no statistical view is generated based on the excluded at least three statistical view candidates, wherein the processing cost incurred in maintaining statistical views in the database management system is reduced by at least a measure associated with the excluded at least three statistical view candidates.

12. The computer-implemented method of claim 11, wherein the first, second, and third specified statistical view candidates comprise different statistical view candidates from the plurality of statistical view candidates, wherein refining the statistical view candidates further comprises at least one or more pruning techniques, wherein the one or more pruning techniques includes, in respective instances, each of:
  (i) merging statistical views that can be subsumed to form a new statistical view candidates;
  (ii) splitting a statistical view into two or more smaller statistical views;
  (iii) increasing the sampling rate on the statistical views; and
  (iv) removing constructs from a statistical view;
  wherein the set of refined statistical view candidates excludes at least four of the plurality of statistical view candidates, each statistical view candidate of which is excluded based on a respective, distinct one of the first, second, third, fourth, and fifth constraints, wherein no statistical view is generated based on the excluded at least four statistical view candidates, wherein the processing cost incurred in maintaining statistical views in the database management system is reduced by at least a measure associated with the excluded at least four statistical view candidates.

13. The computer-implemented method of claim 12, wherein statistical view generation is restricted to statistical view candidate sub-expressions for which the query optimizer generated an inaccurate estimate, wherein the inaccurate estimate comprises an inaccurate cardinality estimate, wherein the inaccurate estimate is programmatically detected by comparing estimated optimization statistics to actual execution statistics;
  wherein refining the plurality of statistical view candidates further comprises generalizing at least two statistical view candidates satisfying a predefined similarity criterion, into a generalized statistical view, wherein the generalized statistical view represents a generalized sub-expression, wherein the generalized sub-expression is derived from distinct sub-expressions comprising a respective sub-expression from each of the at least two statistical view candidates;
  wherein the set of refined statistical view candidates excludes at least five of the plurality of statistical view candidates, each statistical view candidate of which is excluded based on a respective, distinct one of the first, second, third, fourth, and fifth constraints, wherein no statistical view is generated based on the excluded at least five statistical view candidates, wherein the processing cost incurred in maintaining statistical views in the database management system is reduced by at least a measure associated with the excluded at least five statistical view candidates.

14. The computer-implemented method of claim 13, wherein the database management system includes at least one property selected from:
  (i) a first property providing support for pruning conditions for statistical view candidates and with respect to statistical collection time, number of statistical views, number of statistical views per table, the number of tables per statistical view, and the number of columns per statistical view, respectively;
  (ii) a second property providing support for adding expressions in statistical view definitions and further providing support for single-table statistical views with expressions;
  (iii) a third property providing support for, in generating statistical views, inclusion of: (A) column groups, (B) joins having many-to-many relationships between corresponding values contained in joined tables, (C) joins using multiple columns, and (D) the implied joins, comprising joins implied through transitive closure;
  (iv) a fourth property providing support for generating recommendations for generating both informational reference integrity constraints and statistical reference integrity constraints, respectively;
  (v) a fifth property providing support for including, in generating the recommendations, existing statistical views and modifications thereof; and
  (vi) a sixth property providing support for verifying whether recommended statistical views are adopted, as feedback used in generating subsequent recommendations.

15. The computer-implemented method of claim 14, wherein the database management system includes at least two of the first, second, third, fourth, fifth, and six properties, wherein refining the plurality of statistical view candidates further comprises:
  creating one or more virtual statistical views based on one or more of the plurality of statistical view candidates, that are not included in the set of restricted statistical view candidates;
  executing the database workload, whereafter one or more expressions that do not have a match are removed from the one or more virtual statistical views, and one or more virtual statistical views having no matching expressions are removed; and
  adding at least one virtual statistical view of the one or more virtual statistical views to the set of restricted statistical view candidates without violating any of the one or more predefined constraints, wherein the set of restricted statistical view candidates is re-refined in order to ensure that the one or more predefined constraints are satisfied.

16. The computer-implemented method of claim 15, wherein the database management system includes at least three of the first, second, third, fourth, fifth, and six properties, wherein the computer-implemented method further comprises:
  generating a plurality of recommendations by a statistical view advisor component of the database management system, wherein the plurality of recommendations include: (i) a first recommendation to create a referential integrity constraint for at least one join column referenced in the database workload, wherein the referential integrity constraint is, in respective instances, a statistical referential integrity constraint and an informational referential integrity constraint; and (ii) a second recommendation to include sub-expressions and column groups in one or more statistical views that are output; and verifying, by the statistical view advisor component, whether the query optimizer component adopts the plurality of recommendations.

17. The computer-implemented method of claim 16, wherein the database management system includes at least four of the first, second, third, fourth, fifth, and six properties, wherein evaluating the database workload comprises:

determining a plurality of join predicates in the database workload;

determining a set of grouping and ordering operations in the database workload; and identifying a set of tables and columns, including tables and columns used in the join predicates and tables and columns used in the set of grouping and ordering operations.

18. The computer-implemented method of claim 17, wherein the database management system includes at least five of the first, second, third, fourth, fifth, and six properties, wherein the statistical view advisor component is configured to compute a respective arity for each join by determining whether unique keys exist on join columns of at least one join table, wherein the query optimizer component is configured to ignore joins having one-to-one arity when generating one or more statistical views based on the refined statistical view candidates, because the joins do not improve accuracy of the query optimizer component in estimating plan costs, wherein one-to-one arity comprises having a one-to-one relationship between corresponding values contained in joined tables;

wherein each skew and the predefined threshold skew are determined based on a ratio between a count of rows of a respective value having a highest frequency in a respective foreign key compared to an average count of rows per value of the respective foreign key.

19. The computer-implemented method of claim 18, wherein the query optimizer component, when estimating a cardinality for a given join, treats the given join as exhibiting a plurality of predefined properties including a uniform property and an independence property, wherein the uniform property is characterized by having a same number of rows per join column table, wherein the independence property is characterized by join predicates being independent from one another;

wherein the database management system includes all six of the first, second, third, fourth, fifth, and six properties, wherein the database management system supports a predefined query language, wherein the predefined query language is a declarative language and is not an imperative language, wherein the workload comprises a plurality of distinct queries composed according to the predefined query language.

20. The computer-implemented method of claim 19, wherein the skew for at least one of the one or more joins in the database workload is determined based on a predefined measure of statistical dispersion, wherein the predefined measure of statistical dispersion comprises a Gini coefficient, wherein the Gini coefficient is used in detecting skew based on comparing how far a frequency distribution of join columns is from a uniform distribution curve, wherein the frequency distribution is ordered from least-frequently-occurring value to most-frequently-occurring value, when the join columns frequently occurring values and is converted to a cumulative frequency distribution;

wherein a predefined command is issued in order to update catalog statistics used by the query optimizer component, wherein the predefined command is issued with a predefined option, the predefined option specifying to apply a sampling technique configured to sample table data is not uniformly distributed, wherein the catalog statistics pertain to at least record count, page count, a record size, and column-data distribution information, respectively.

* * * * *